United States Patent [19]
Huang

[11] Patent Number: 5,655,316
[45] Date of Patent: Aug. 12, 1997

[54] SHOE WITH WEIGHING AND STEP COUNTING MEANS

[75] Inventor: Tien-Tsai Huang, Pan-Chiao, Taiwan

[73] Assignee: Raymond Hwang, Chang Hua Hsien, Taiwan

[21] Appl. No.: 570,638

[22] Filed: Dec. 11, 1995

[51] Int. Cl.⁶ ............... A43B 5/00; A43B 13/20; A61B 5/00; G01L 7/00
[52] U.S. Cl. ............... 36/132; 36/136; 36/29; 128/779; 73/172; 73/714
[58] Field of Search ............... 36/132, 136, 29, 36/3 B; 128/779; 73/172, 714

[56] References Cited

U.S. PATENT DOCUMENTS

| | | | |
|---|---|---|---|
| 2,558,805 | 7/1951 | Yaglou | 73/172 |
| 3,791,375 | 2/1974 | Pfeiffer | 73/172 |
| 3,974,491 | 8/1976 | Sipe | 73/172 |
| 4,610,099 | 9/1986 | Signori | 36/3 B |
| 5,107,854 | 4/1992 | Knotts et al. | 73/172 |
| 5,230,249 | 7/1993 | Sasaki et al. | 36/132 |
| 5,313,717 | 5/1994 | Allen et al. | 36/29 |

*Primary Examiner*—M. D. Patterson
*Attorney, Agent, or Firm*—Fish & Richardson P.C.

[57] ABSTRACT

A shoe including a shoe body having an outsold and an upper fastened to the outsole; an insole formed as an air bag filled with air and mounted within the outsole; a pressure inductor connected to the insole to detect the pressure applied to the insole; a circuit board mounted in the insole and consisting of a pressure converter and a microprocessor, the pressure converter converting the pressure detected by the pressure inductor into a frequency signal to be processed by the microprocessor so that the microprocessor obtains a value corresponding to the pressure applied to the insole; and a liquid crystal display connected to the microprocessor to display the value obtained by the microprocessor.

11 Claims, 3 Drawing Sheets

SHOE WITH WEIGHING AND STEP COUNTING MEANS

FIELD OF THE INVENTION

The present invention relates to shoes, particularly to such a shoe which can measure the weight of the user and count the number of steps.

BACKGROUND OF THE INVENTION

In a well-developed modern society, people often eat too many garbage foods, however spend little time in exercises. Therefore, most people have an excessive weight. Because the weight has a great concern with one's physical condition, some persons measure their weight daily in order to control it within a suitable range. However, most weighing scales, including the so-called handy weighing scales, are not convenient to be carried with. Since jogging is a sport suitable for all ages, and is helpful to the health, persons may carry a counter to count the number of steps while jogging. However, it is not convenient to hold a counter in hand when jogging. If one forgets to carry a counter, he will be unable to count the number of steps.

SUMMARY OF THE INVENTION

The present invention is accomplished under the circumstances in view. It is an object of the present invention to provide a shoe which can be used as a weighing instrument to measure the user's weight. It is another object of the present invention to provide a shoe which can be used as a counting means to count the number of steps when the user is walking or running. According to one aspect of the present invention, the shoe, which can be made of any of a variety of kinds and shapes, comprises a shoe body having an outsole defining a receiving chamber, and an upper fastened to the outsole; an insole formed as an air bag and filled with air and mounted within the receiving chamber of the outsole; a pressure inductor connected to the insole to detect the pressure applied to the insole; a circuit board mounted in the insole and consisting of a pressure converter and a microprocessor, and the pressure converter converting the pressure detected by the pressure inductor into a frequency signal to be processed by the microprocessor so that the microprocessor obtains a value corresponding to the pressure applied to the insole; and a liquid crystal display connected to the microprocessor to display the value obtained by the microprocessor. According to another aspect of the present invention, the air bag of the insole is comprised of a front air chamber, a rear air chamber, and an intermediate air chamber which is disposed in communication between the front air chamber and the rear air chamber. The intermediate air chamber has an air outlet sealed with a diaphragm. The pressure inductor is coupled with a connector, which has a pointed projection at one end, and a longitudinal center hole. When the connector is installed, the pointed projection pierces the diaphragm of the air outlet of the intermediate air chamber, permitting air to flow from the insole to the pressure inductor. According to still another aspect of the present invention, the microprocessor is connected to a function key, which controls the display mode of the microprocessor. The display mode of the microprocessor can be a weight display mode, step number display mode, or a maximum weight display mode. When the display mode is switched to the weight display mode, the microprocessor shows through the liquid crystal display the current weight being measured. When the function key is switched to the step number display mode, the microprocessor shows through the liquid crystal display the number of steps applied by the user. When the display mode is switched to the maximum weight display mode, the microprocessor shows through the liquid crystal display the maximum value obtained, which will not change when a weight later measured is lower than that previously measured, but which will change if a weight later measured is higher.

DETAILED DESCRIPTION OF THE PREFERRED EMBODIMENT

Figure 1:
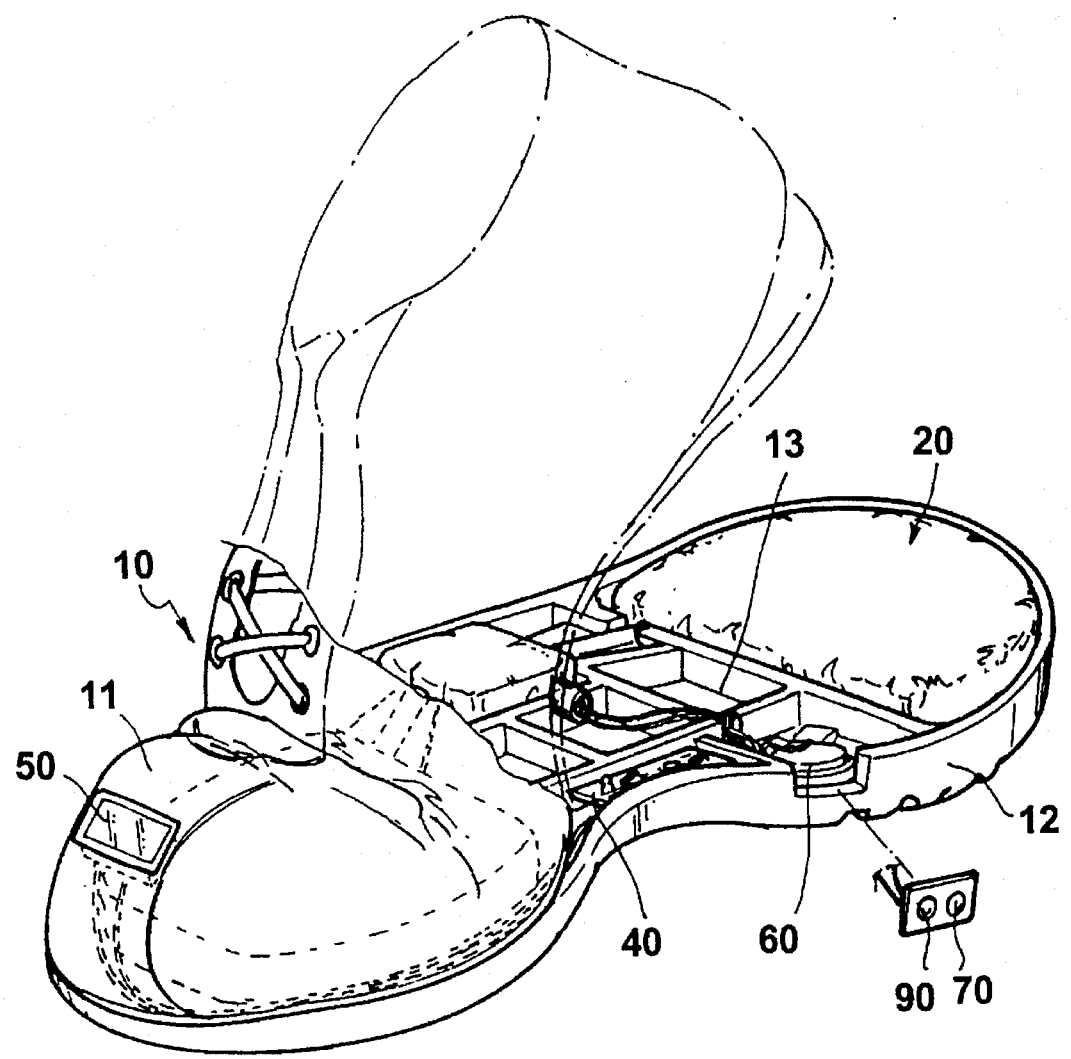
FIG. 1 shows the internal structure of a shoe according to the present invention.

Referring to FIG. 1, a shoe in accordance with the present invention is generally comprised of a shoe body 10, an insole 20, a pressure inductor 30 (see FIG. 2B), a circuit board 40, a LCD 50, a battery 60, a press button switch 70, and a function key 90. The shoe body 10 comprises an upper 11 and an outsole 12. The LCD 50 is mounted on the upper 11 at the front side of the shoe. The insole 20, the circuit board 40, and the battery 60 are installed in a receiving chamber 13 defined within the outsole 12. The press button switch 70 and the function key 90 are mounted on the outside of the outsole 12 at a lateral side.

Figure 2B:
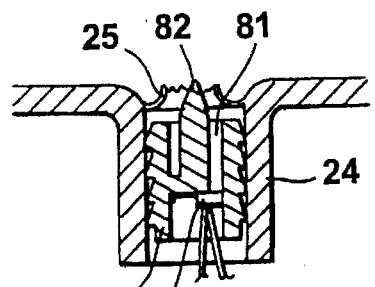
FIG. 2B is a sectional view in an enlarged scale taken on a part of FIG. 2A, showing the connector of the pressure inductor fastened to the air outlet of the intermediate air chamber according to the present invention.
Figure 2A:
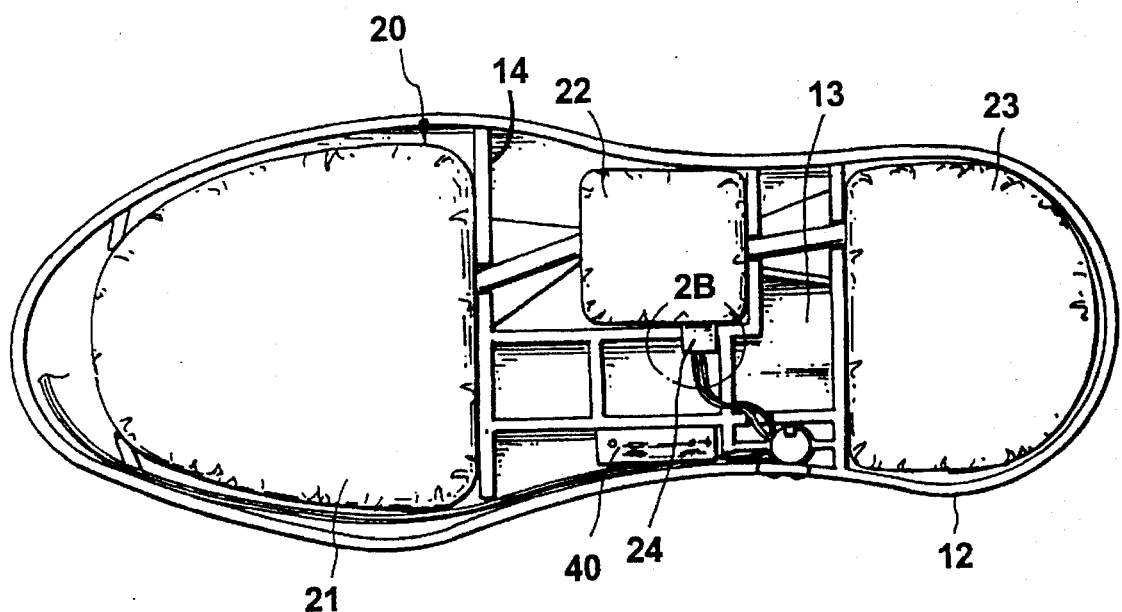
FIG. 2A is a top view showing the insole installed in the receiving chamber defined within the outsole according to the present invention.

Referring to FIGS. 2A and 2B, the insole 20 is a hollow, soft structure filled with air, and comprised of a front air chamber 21, a rear air chamber 23, and an intermediate air chamber 22 in communication between the front air chamber 21 and the rear air chamber 23. The insole 20 may be secured by an anchoring means 14 fixed on the receiving chamber 13. The anchoring means 14 may include partition ribs formed integral with the outsole 12. The intermediate air chamber 22 has an air outlet 24 sealed by a diaphragm 25. The pressure inductor 30 is coupled with a connector 80. The connector 80 comprises a longitudinal center through hole 81 and a pointed front projection 82. When the connector 80 is connected to the air outlet 24, the pointed front projection 82 pierces the diaphragm 25, permitting air to flow from the insole 20 to and so impact on the pressure inductor 30. Therefore, when the user steps on the insole 20, the pressure inductor 30 is induced by the pressure of the user's weight.

Figure 3:
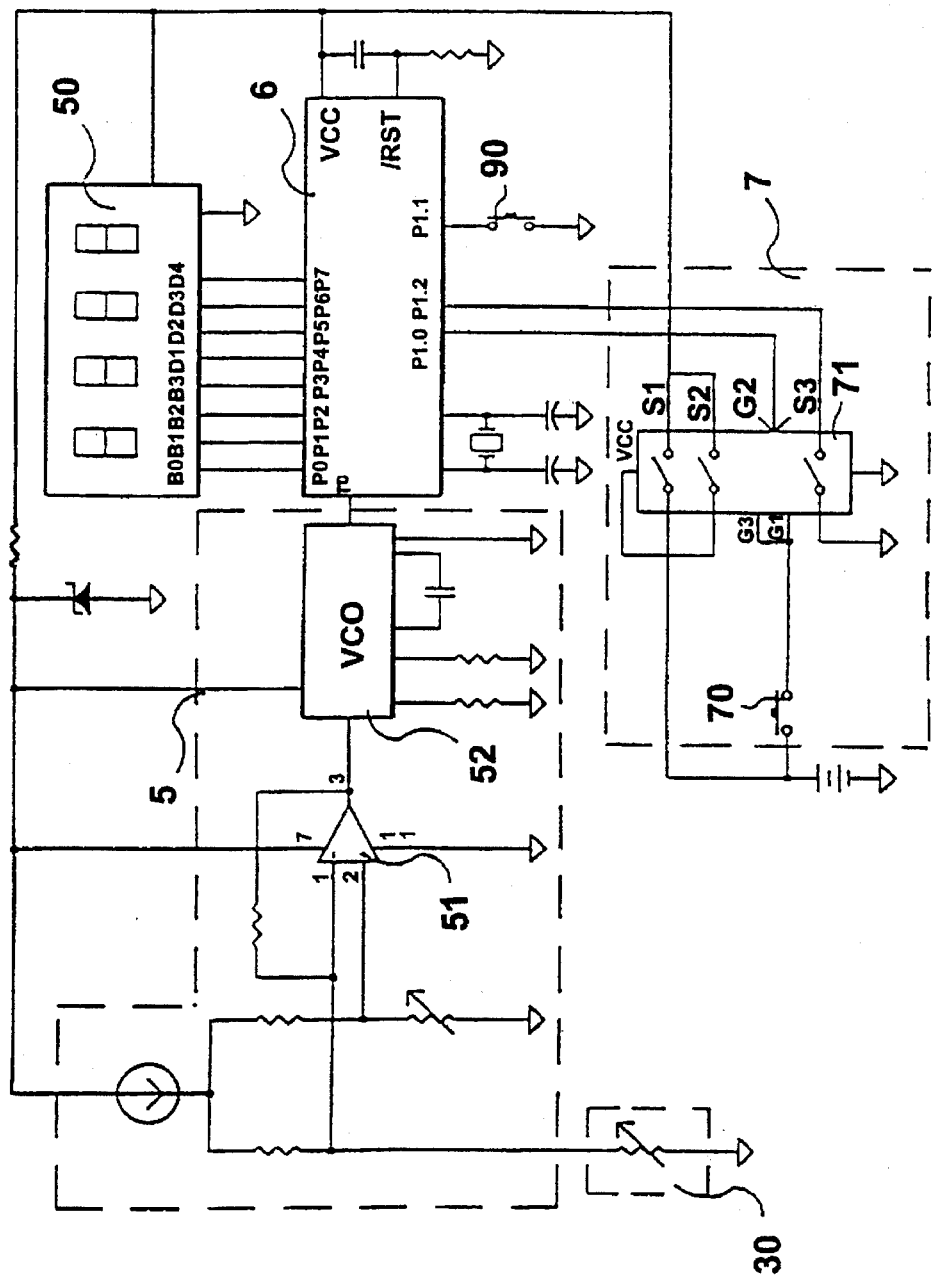
FIG. 3 is a circuit diagram according to the present invention.

Referring to FIG. 3, when the pressure inductor 30 is induced, its impedance is relatively changed, and therefore a signal is outputted from the pressure inductor 30 to the circuit board 40. The output signal from the pressure inductor 30 is amplified by an amplifier 51 of a pressure converter 5, and then converted to a frequency signal by the VCO (voltage control oscillator) 52 of the pressure converter 5. The frequency signal from the pressure converter 5 is then sent to a microprocessor 6. The power saving circuit, referenced by 7 and being connected to the microprocessor 6, is comprised of a press button switch 70 and a linear switch 71. When the press button switch 70 is on, power supply is connected to the power input terminal of the microprocessor 6 through the linear switch 71 to start the system. When the system is started, a signal is sent to G2 of the linear switch 71 to lock power supply, and G2 will be cut off only when the press button switch 71 is pressed again. The function key 90 is connected to the microprocessor 6 for switching among three modes, namely, the weight display mode, the maximum weight display mode, and the step number display mode. When the function key 90 is switched to the weight display mode, the microprocessor 6 shows through the LCD 50 per every 0.1 second the current weight measured. When the function key 90 is switched to the maximum weight display mode, the microprocessor 6 shows the maximum weight measured through the LCD 50, and the reading of the display will be changed only a higher weight is measured. When the function key 90 is switched to the step number display mode, the microprocessor 6 counts the number of steps applied by the user to the insole and the counting is shown through the LCD 50. The microprocessor 6 is set with a predetermined value, when the pressure measured surpasses the predetermined value and then drops below it, the microprocessor 6 adds one to the reading, therefore the number of steps is measured when the user walks or runs.

It is to be understood that the drawings are designed for purposes of illustration only, and are not intended as a definition of the limits and scope of the invention disclosed.

I claim:

1. A shoe comprising:
   a shoe body having an outsole defining a receiving chamber, and an upper fastened to said outsole;
   an insole formed as an air bag filled with air;
   a pressure inductor connected to said insole to detect the pressure of the air imposed on the pressure inductor in response to pressure applied to said insole;
   a circuit board mounted in the receiving chamber of said insole, comprising a pressure converter and a microprocessor, said pressure converter converting the pressure detected by said pressure inductor into a frequency signal having a variable frequency representative of the detected pressure, the frequency signal processed by said microprocessor so that said microprocessor provides a value corresponding to the pressure of the air inside the insole; and
   a liquid crystal display connected to said microprocessor to display the value calculated by said microprocessor.

2. The shoe of claim 1, wherein said liquid crystal display is mounted on the upper of said shoe body.

3. The shoe of claim 2, wherein said insole has an air outlet sealed with a diaphragm; said pressure inductor is coupled with a connector, said connector has a longitudinal through hole and a pointed front projection, said pointed front projection extending through the diaphragm of said air outlet, permitting air to flow from said insole to said pressure inductor.

4. The shoe of claim 1, wherein said microprocessor is connected to a function key, and has a display mode changeable with the state of said function key.

5. The shoe of claim 4, wherein said display mode is a step number display mode which shows the number of steps applied by the user to said insole and measured by said microprocessor by adding one to the reading when the pressure measured surpasses a predetermined value and then drops below it.

6. The shoe of claim 4, wherein said display mode is a maximum weight display mode which shows through said liquid crystal display the maximum value obtained by said microprocessor.

7. The shoe of claim 1, wherein said insole comprises a front air chamber, a rear air chamber, and an intermediate air chamber communicating between said front air chamber and said rear air chamber.

8. The shoe of claim 7, wherein said intermediate air chamber has an air outlet connected to said pressure inductor.

9. The shoe of claim 1, wherein said insole is secured to the outsole by an anchoring means.

10. The shoe of claim 9, wherein said anchoring means include partition ribs formed integral with the outsole.

11. The shoe of claim 1 further comprising a connector coupled to the pressure inductor, and wherein the insole includes an air outlet and a diaphragm sealed within the air outlet, the connector being tightly engaged with the air outlet.

* * * * *